United States Patent
Rapp et al.

(10) Patent No.: US 10,146,581 B2
(45) Date of Patent: Dec. 4, 2018

(54) DYNAMICALLY CONFIGURING A PROCESS BASED ON ENVIRONMENTAL CHARACTERISTICS MONITORED BY A MOBILE DEVICE

(71) Applicant: salesforce.com, inc., San Francisco, CA (US)

(72) Inventors: Adrian Dieter Rapp, Sausalito, CA (US); Qingqing Liu, Dublin, CA (US); Michael Chou, Burlingame, CA (US)

(73) Assignee: salesforce.com, inc., San Francisco, CA (US)

( * ) Notice: Subject to any disclaimer, the term of this patent is extended or adjusted under 35 U.S.C. 154(b) by 136 days.

(21) Appl. No.: 15/405,708

(22) Filed: Jan. 13, 2017

(65) Prior Publication Data

US 2018/0203731 A1 Jul. 19, 2018

(51) Int. Cl.
*G06F 9/46* (2006.01)
*G06F 9/50* (2006.01)
*G06Q 50/00* (2012.01)

(52) U.S. Cl.
CPC .......... *G06F 9/5005* (2013.01); *G06Q 50/01* (2013.01)

(58) Field of Classification Search
CPC ............. G06F 9/5005; G06F 17/30371; G06F 17/30463; G06Q 50/01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Camquy Truong
(74) *Attorney, Agent, or Firm* — Weaver Austin Villeneuve & Sampson LLP

(57) ABSTRACT

Disclosed are non-limiting examples of systems, apparatus, methods and computer program products for dynamically configuring a process associated with an application based on environmental characteristics monitored by a mobile device. In some implementations, the process includes stages and decision nodes. There is a configurable flow along a path defined by a subset of the stages controlled by a subset of the decision nodes. Contextual data is provided by the mobile device on which the application is usable. The contextual data indicates one or more environmental characteristics associated with a physical environment in which the mobile device is or has been located. The contextual data can be provided as a control input to a decision node associated with a current stage of the process. The process can be configured accordingly.

20 Claims, 8 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1* | 4/2003 | Coker .............. G06Q 30/02 719/318 |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | | |
|---|---|---|---|
| 2005/0188348 A1* | 8/2005 | Han | G06T 19/00 |
| | | | 717/105 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshaysky et al. | |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0359537 A1 | 12/2014 | Jakobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0135198 A1 | 5/2015 | Pack et al. | |
| 2015/0142596 A1 | 5/2015 | Jakobson et al. | |
| 2015/0172563 A1 | 6/2015 | Jakobson et al. | |

\* cited by examiner

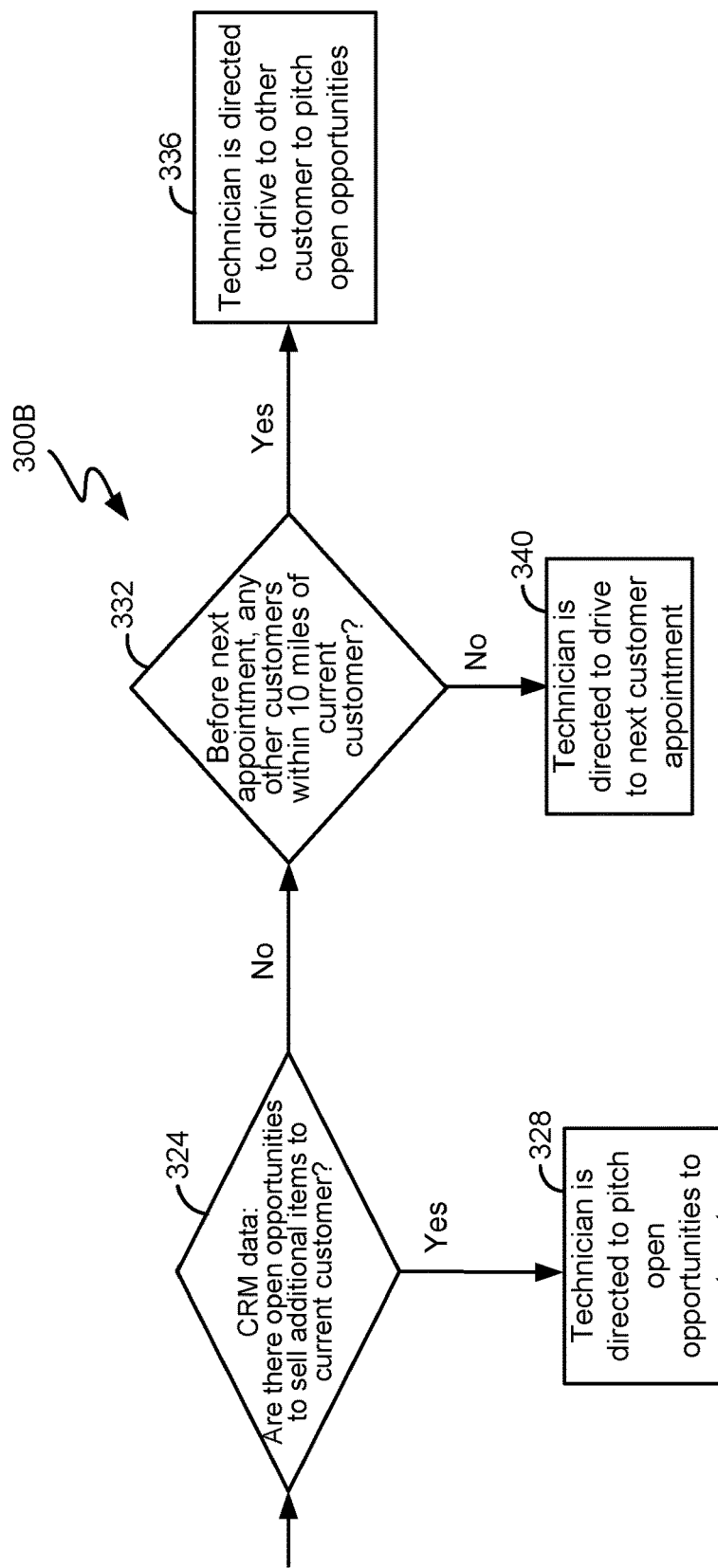

US 10,146,581 B2

DYNAMICALLY CONFIGURING A PROCESS BASED ON ENVIRONMENTAL CHARACTERISTICS MONITORED BY A MOBILE DEVICE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document generally relates to processes in a computing environment and, more specifically, to techniques for configuring processes based on contextual data provided by a mobile device.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 3B shows a partial flow diagram of another example of a process 300B being dynamically configured based on environmental characteristics monitored by a mobile device, according to some implementations.

DETAILED DESCRIPTION

Figure 1:
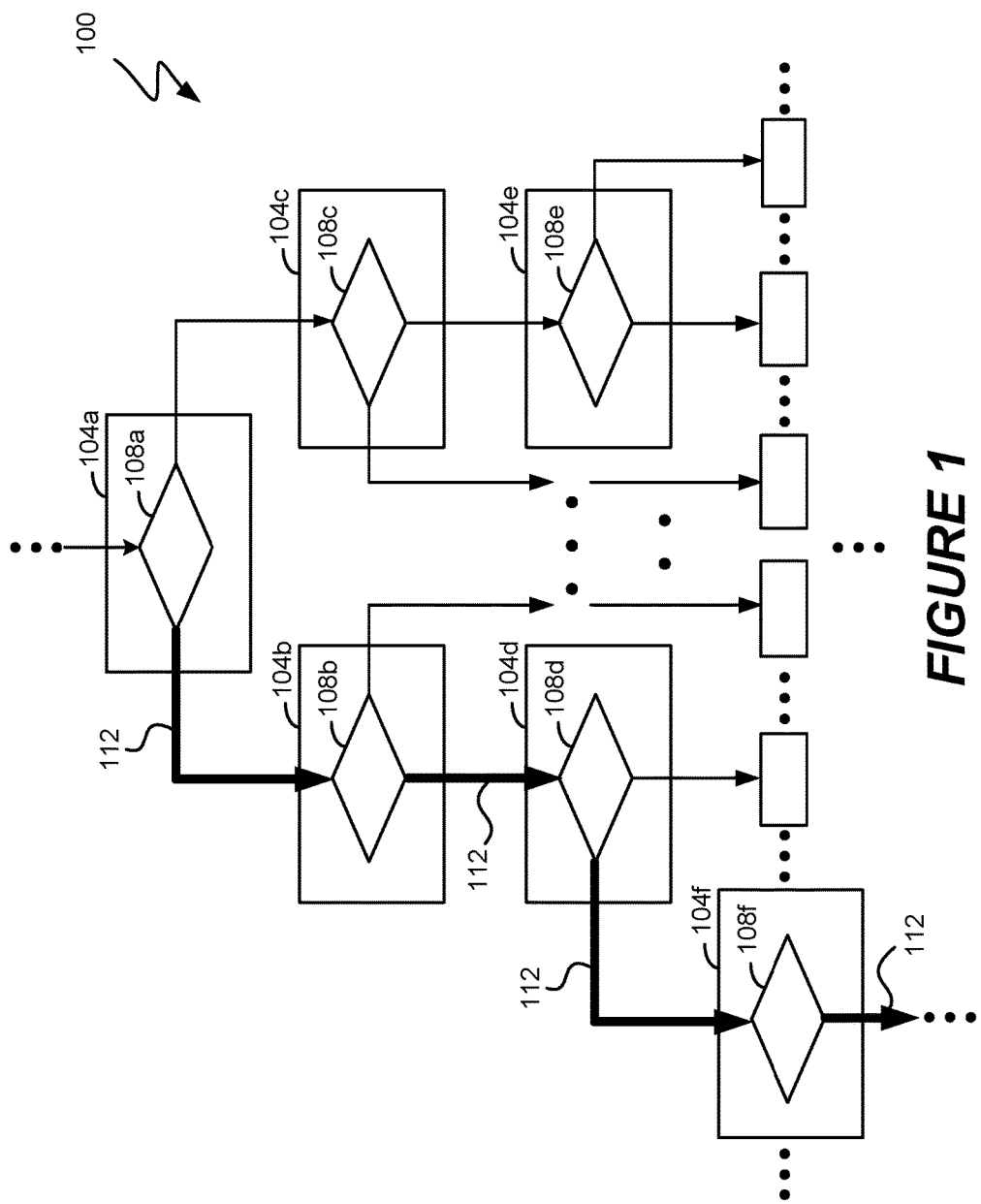
FIG. 1 shows a block diagram of an example of a framework 100 of sequences of stages and associated decision nodes for dynamically configuring a process associated with an application based on environmental characteristics monitored by a mobile device, according to some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus and computer program products for dynamically configuring a process based on environmental characteristics monitored by a mobile device. In some implementations, the behavior, logic and/or functionality of a process associated with a computing application can be dynamically determined and/or altered using contextual data automatically detected by the electronics of a user's mobile device, such as a smartphone. In some implementations, the process is a part of a native application, that is, a computing application installed on the mobile device. In some other implementations, the process and computing application are partially or entirely server-based, such as in the case of cloud-based services accessible via a web browser installed on the mobile device. In such server-based scenarios, when a process is partially or entirely carried out by one or more servers, a server sends data and instructions to the mobile device to control what is displayed on the device. While the process is being carried out, the mobile device can be monitoring and sending to the server contextual data indicating environmental characteristics of a physical environment in which the mobile device is or has been located such as accelerometer data, geolocation data, altitude data, battery life, network signal strength, proximity sensor data, detected light levels, audio data indicating background noise level, fingerprint sensor data identifying a fingerprint of a user touching a display screen of the mobile device, or any combination thereof. When such information is received at the server, the information can be provided as a control input to determine the next stage of the configurable process, as further explained herein.

Those skilled in the art should appreciate that, in some implementations, the server-based processing described above is carried out on the mobile device, so the disclosed techniques can be implemented entirely on the mobile device rather than in a client-server scenario.

In some implementations, the contextual data is stored in metadata and processed to configure, modify and/or optimize the behavior, logic and/or functionality of a process to provide more relevant computing services to a user of the application. The sequence of stages of a process can thus be dynamically determined. The logic driving an application's behavior and user interface on the mobile device can thus be controlled in near real-time using contextual data. In some other implementations, the behavior and user interface of an online service accessible via a web browser on a mobile device can similarly be controlled and altered.

In some implementations, the criteria of certain rules associated with a current stage of a process can be applied to contextual data to determine which stage or sequence of stages follows the current stage when the rules are automatically applied in carrying out the process. For instance, a rule can specify that stage C rather than stage B is to follow current stage A when monitored geolocation data or battery life is within a designated numerical range or has some other condition/characteristic. Thus, the flow of a process and associated data to be displayed to a user can be dynamically changed from its default path based on contextual data. In some other implementations, the criteria itself can be set or adjusted using contextual data or a history of contextual data to affect which stage follows the current stage. In some other implementations, metadata controlling rules or business logic can be altered based on contextual data.

In a non-limiting example, salesforce.com, inc. of San Francisco, Calif. provides cloud-based workflow tools such as Visual Workflow™ or Lightning Process Builder™, which provides to customer organizations of salesforce.com, inc. an online service for graphically representing and declaratively building automated business processes using workflow rules. System events, processing stages, decision nodes, sequences of stages, tasks such as user actions, etc. can be selected, inserted, manipulated and customized to set up an automated process framework using Lightning Process Builder™. For instance, a system administrator (admin) or other authorized user can drag and drop blocks of logic corresponding to stages to create and customize a process. The admin can graphically insert and customize decision nodes, for instance, so a "Yes" outcome to a decision leads a user down one path, while "No" leads down another. The admin can work through a user interface to define and customize stages and process flow in terms of business logic and decision nodes. For instance, rules and criteria can be selected, customized, and applied at a decision node.

In some implementations, the disclosed techniques can be used in relation to various applications and online services that provide mobile field service, because a common goal in mobile field service is to provide a field service technician or other user carrying a mobile device with a "guided path", which suggests next steps in the form of tasks for the user to complete her work using her mobile device. Signals carrying contextual data can be relayed from the mobile device to a server as an input to a process constructed with a tool such as Lightning Process Builder™, which defines state transitions, visibility of fields, workflow triggers, etc. for a process to move from one stage to the next. For instance, a field service technician using a particular process could have a default sequence of tasks, which the technician is instructed to follow. With some of the disclosed techniques, however, a decision node can be linked with each task to determine what the next task or set of tasks will be according to current contextual data detected at the technician's mobile device. Tasks can be removed, skipped, replaced, altered, added, etc. depending on current environmental characteristics. Mobile device contextual data can thus be leveraged by a process and associated application to present an optimized user interface to the user, intelligently suggest next best tasks or other actions, restrict the user from taking actions which are not optimal in the current environment, and surface more relevant information to the user. The ultimate flow of the process as affected by the contextual data will be relayed back to the mobile device to be presented in a user interface to enhance and streamline the user experience.

By way of illustration, Bob is a field service technician employed by a cable television company. When Bob is dispatched to perform a repair at a customer site, he uses a mobile service app on his iPhone®. The mobile service app interacts with a process on a back-end server that prompts Bob to enter various data and instructs Bob as to tasks to perform to complete a repair. Some of the disclosed techniques can be implemented to leverage contextual data relayed from Bob's mobile device to the server. Based on the relayed environmental characteristics, the server can send a signal to update the user interface on Bob's mobile device to be scoped to the most relevant information for Bob at the particular stage of performing the repair. Based on what is deciphered from Bob's contextual data, Bob is guided through a dynamically configured process for a user experience based on what the cable television company wants, such as specific next tasks to perform, instructions as to how to perform the tasks, focused questions to gather pertinent user input from Bob, etc. Thus, Bob can efficiently and effectively respond to and navigate through a variety of scenarios.

When Bob is completing his repair job, background noise relayed by Bob's iPhone® can be processed to determine that Bob is in too noisy of an environment. Thus, a default process flow can be altered using the disclosed techniques to cause a page layout to be displayed on Bob's iPhone® that only provides Bob with the option of manually typing a report rather than the default next step of instructing Bob to make a voice recording or video. Or if the battery life on Bob's iPhone® is below a threshold, Bob can be instructed to refrain from the usual next step of taking a picture to validate that the repair is complete. Instead, Bob can be instructed to check his email later for a link to click through and manually update a database record. In another example, geolocation information relayed by Bob's iPhone® may indicate that Bob has already left the customer site before completing the report. Thus, the process flow can be changed to create a task instructing Bob to return to the site by a certain deadline and only then record the serial number of an installed piece of hardware. Otherwise, a prompt would be immediately displayed on Bob's iPhone® asking for the serial number. By the same token, the timing of obtaining a customer's signature can be changed depending on geolocation information. If Bob is still at the customer site, Bob can be prompted to obtain the customer's signature. If Bob has left the site, Bob can be prompted to return to the site or skip the signature stage and start working on the next job order.

Some of the disclosed techniques can be similarly implemented to assist mobile workers in other field service scenarios such as insurance claims representatives dispatched to an automobile accident site to assess damage, automobile glass repair technicians dispatched to a customer's home to replace a windshield of a specific make, model and year of the customer's car, package delivery persons, and door-to-door salespeople. In some scenarios, contextual data can be used to determine an optimal communication channel for a technician or other user to communicate with her team, manager, dispatcher, etc. For example, in low bandwidth environments, instant messaging may be more desirable than a phone call or video conference. Thus, in various settings, a guided, dynamically customized and optimized flow with up-to-date and relevant instructions for a user can be provided by practicing some of the disclosed implementations.

FIG. 1 shows a block diagram of an example of a framework 100 of sequences of stages and associated decision nodes for dynamically configuring a process associated with an application based on environmental characteristics monitored by a mobile device, according to some implementations. In FIG. 1, a process can be defined and dynamically configured with any number of stages, some of which are identified by reference numerals 104a-104f. Some stages such as stages 104a-104f have associated decision nodes, as identified by reference numerals 108a-108f. A process implemented and configured according to framework 100 of FIG. 1 can be a component of an application installed on a mobile device. In some other implementations, the application can be located on one or more servers with which a mobile device can interact to receive and display output data of the application. In some other implementations, one or more components of an application are installed on the mobile device, while other components of the application are installed on a server.

In FIG. 1, the process has a configurable flow along any number of possible paths through various stages. The ultimate path followed by the process is controlled at least in part by outcomes of determinations at decision nodes, such as nodes 108a-108f of stages 104a-104f. For example, applying criteria at a subset of decision nodes, namely nodes 108a, 108b, 108d and 108f has resulted in a path 112 defined by a subset of stages corresponding to the subset of decision nodes, namely stages 104a, 104b, 104d and 104f. Thus, the selection of a particular subset of stages to define the flow of a process is determined at least in part by the application of a criterion or criteria at each decision node. In this example, defining and/or updating criteria at a given node as well as the contextual data to which the criteria is applied affects the next stage to follow a current stage and impacts which particular subset of stages is followed to define path 112. Business rules applying the criteria and other application-specific information of the particular process will also have an effect on the outcome at a given decision node. Various other paths in addition to or as an alternative to path 112 can be followed using various different subsets of the stages illustrated in FIG. 1 to define a configurable flow.

Figure 2:
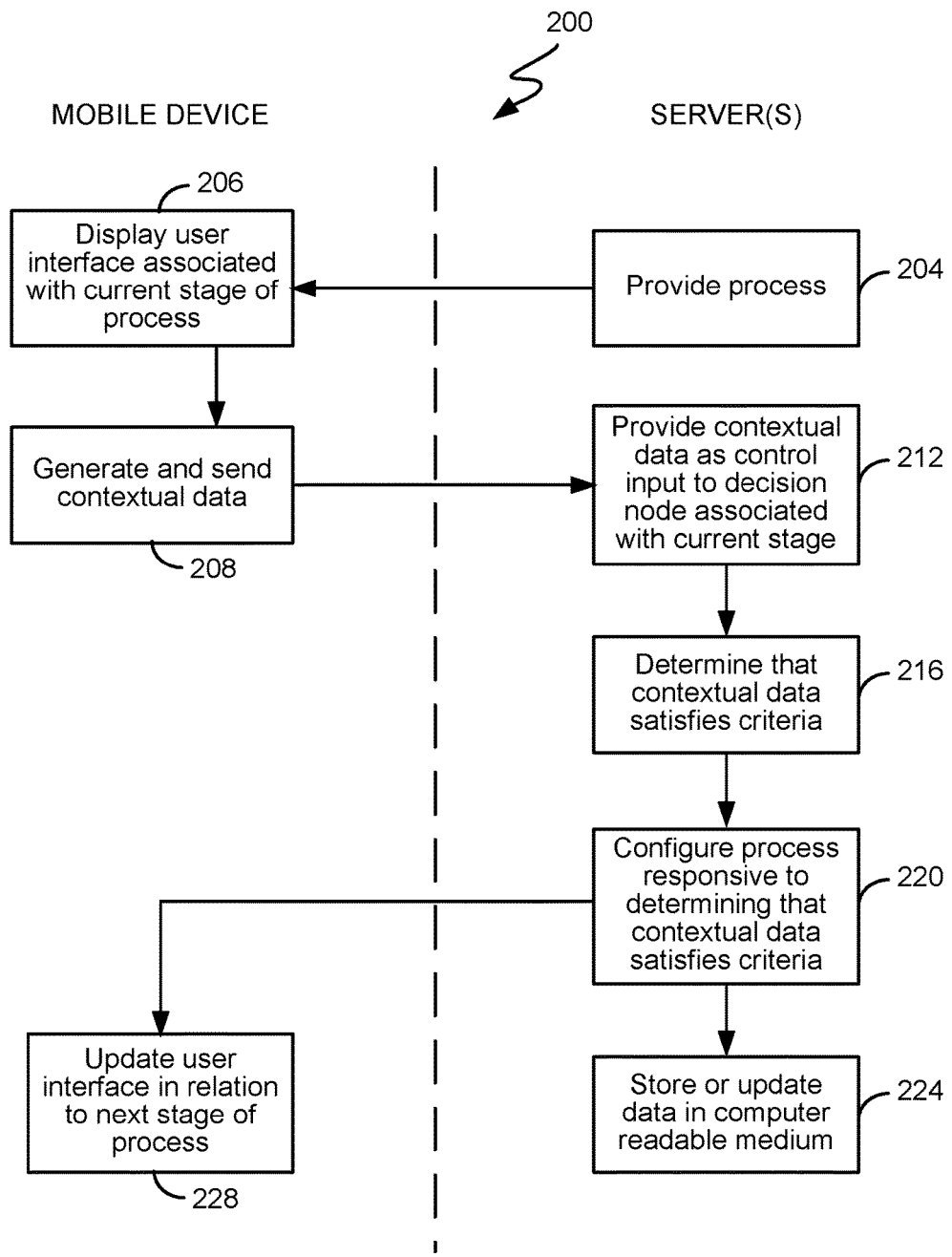
FIG. 2 shows a flowchart of an example of a method 200 for dynamically configuring a process associated with an application based on environmental characteristics monitored by a mobile device, according to some implementations.

FIG. 2 shows a flowchart of an example of a method 200 for dynamically configuring a process associated with an application based on environmental characteristics monitored by a mobile device, according to some implementations. In FIG. 2, at 204, one or more servers provide a process associated with an application. That is, in this example, the process is managed at one or more servers in the cloud and delivers data to a mobile device that can be displayed or cause updating of a user interface on a display of the device. This displaying and updating of data in a user interface can encompass not only the display of particular graphical objects, text, instructions and fields in a presentation, but also the available graphical input controls and/or types of controls for a given field based on contextual data. In FIG. 2, during the performance of the process, at 206, the mobile device displays a user interface associated with a current stage of the process. At 208, contextual data as gathered by the mobile device is transmitted to the server. It should be noted that 208 need not follow 206, for instance, when contextual data has been transmitted to the server before displaying or updating the user interface at 206.

In FIG. 2, when the server receives the contextual data from the mobile device, at 212, the server can use the contextual data as a control input to a decision node associated with a current stage of the process, as illustrated in FIG. 1. For example, criteria can be applied to the contextual data generated at 208 of FIG. 2. At 216, the server applies one or more criteria corresponding to a decision node of the current stage of the process to determine an outcome and corresponding next stage of the process. For example, at 216, one or more user-configurable workflow rules can be applied, where the workflow rules incorporate the criteria. As further illustrated herein, a workflow rule can be configured using a reference value with which at least a portion of the contextual data can be compared. For example, a workflow rule can be satisfied when a power level or other battery status data provided by the mobile device is less than or equal to 5 volts.

In FIG. 2, depending on the outcome of whether the contextual data obtained from the mobile device satisfies one or more criteria at the current decision node, at 220, the server dynamically configures the process by determining one or more next stages along which the process is to flow. At 224, the server can store or update data in a database or other suitable computer readable medium to track path 112 of the process, as illustrated in FIG. 1. In FIG. 2, at 228, before or after the storage of data at 224, the server can transmit a signal to the mobile device to cause the user interface to display instructions, relevant data and any other graphical content to at least indicate the next stage of the process as determined at 220.

As mentioned above, when criteria is applied to contextual data to determine a next stage of the process, the process can be dynamically configured by replacing a stage, removing a stage, adding a stage, and/or modifying a stage based on the contextual data. Also, while FIG. 2 shows an example in which one or more servers perform the above-described operations at 204, 212, 216, 220 and 224, some alternative examples provide for the mobile device to perform one or more of such operations, as should be appreciated by those skilled in the art.

The overall behavior, logic and/or functionality of a process can be determined or configured using the disclosed techniques, as can a particular stage of the process. In some implementations, a next stage of a process as determined using the disclosed techniques can include specific tasks or other user actions. In some implementations, the next stage of a dynamically configurable process indicates one or more tasks instructed or suggested to a user to perform. A specific task, which a user is instructed to perform at a next stage of a configurable process can be determined and/or configured based on contextual data received from a mobile device. For example, as further illustrated in the examples below, a task-based workflow can be defined or modified in relation to contextual data to govern which tasks are conveyed to a user's mobile device. For instance, the specific battery level of the mobile device in relation to a threshold may govern whether a user is instructed to change power settings on the device or put the device in sleep mode. In some implementations, a system event associated with a next stage of a dynamic process can be determined and/or configured to be performed in relation to a social network feed, as in the case of a social networking system being available. In some other implementations, a system event can be performed in relation to a customer relationship management (CRM) record stored in a database, for instance, when one or more fields of the record are to be updated.

Figure 3A:
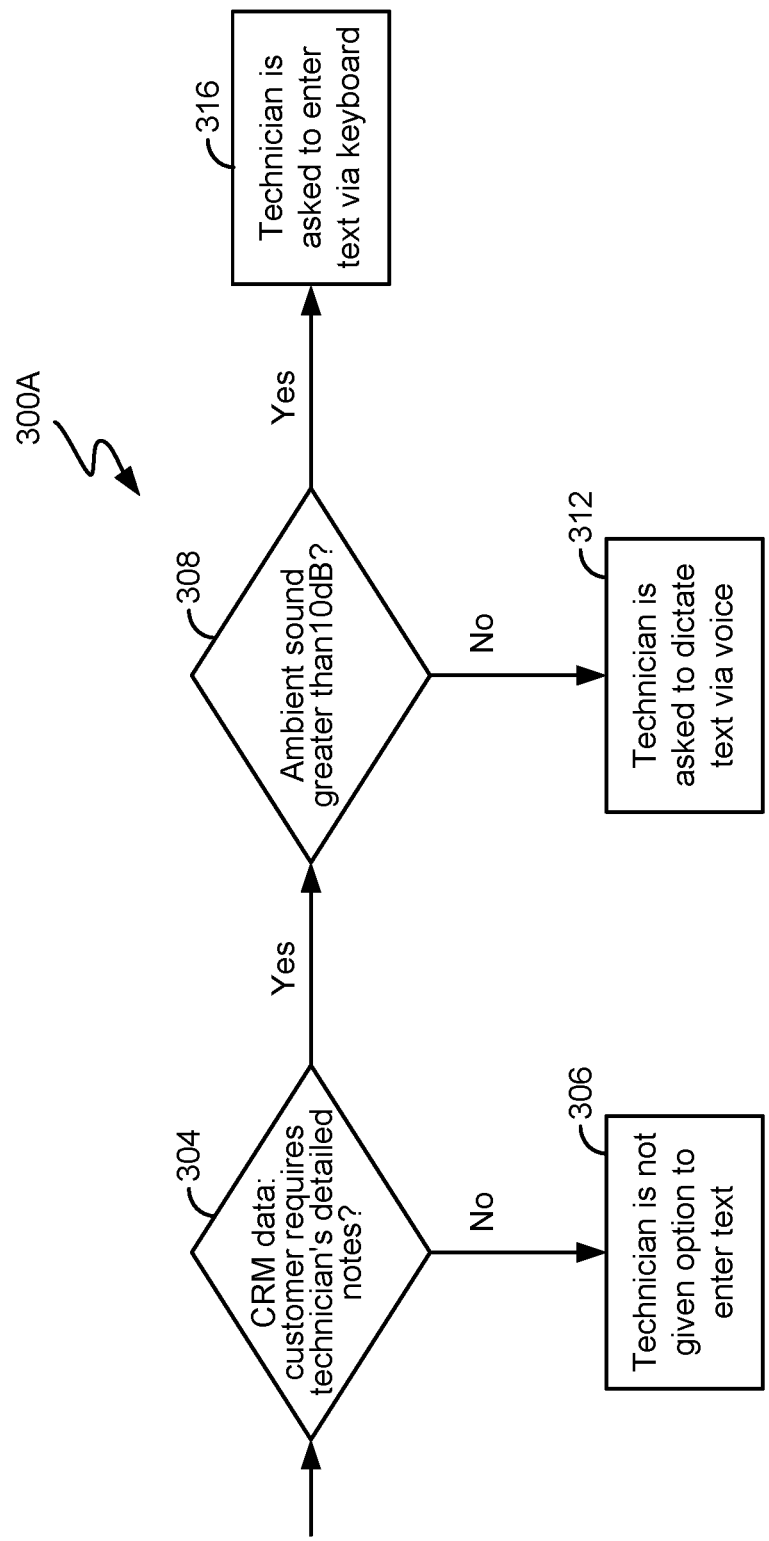
FIG. 3A shows a partial flow diagram of an example of a process 300A being dynamically configured based on environmental characteristics monitored by a mobile device, according to some implementations.

FIG. 3A shows a partial flow diagram of an example of a process 300A being dynamically configured based on environmental characteristics monitored by a mobile device, according to some implementations. In FIG. 3A, as part of the performance of dynamically configurable process 300A, a decision node 304 is reached. It is determined at decision node 304 in the setting of a given application whether a field service technician using a mobile device is required to deliver detailed notes to a customer being serviced by the technician. For instance, a customer case or other CRM record stored in a CRM database can be checked to determine whether delivery of notes is appropriate. If not, the flow of process 300A proceeds to 306, where a user interface on the technician's mobile device is controlled to prevent entering text, which the technician would otherwise do to update the customer's case in the CRM database.

In FIG. 3A, returning to node 304, in situations where the detailed notes are supposed to be delivered to the customer as part of the application being used by the technician, process 300A is configured to flow to decision node 308, at which it is determined whether ambient sound picked up by a microphone on the technician's mobile device is greater than a threshold level, such as 10 decibels (dB) in this example. When the ambient sound detected by the technician's mobile device is less than or equal to 10 dB, in this example, process 300A is configured to flow to stage 312, at which a prompt is generated in a user interface on the mobile device requesting that the technician dictate notes by speaking into the microphone. Returning to decision node 308, when ambient sound is greater than 10 dB, in this example, the flow of process 300A is configured to proceed to stage 316, at which a prompt is displayed on the technician's mobile device requesting the technician to manually enter text using a keyboard, as opposed to voice dictation. Returning to decision node 308, those skilled in the art should appreciate that the 10 dB value is one of many examples of a threshold, which can be user-specified and customized as desired to affect the flow of process 300A.

FIG. 3B shows a partial flow diagram of another example of a process 300B being dynamically configured based on environmental characteristics monitored by a mobile device, according to some implementations. In the example of FIG. 3B, when a field service technician finishes servicing a current customer at the customer's location, dynamically configurable process 300B reaches decision node 324 during execution of an application with which process 300B is associated. A CRM record stored in a database is checked at node 324 to determine whether there are any open opportunities or other types of CRM records for the technician to sell additional items to the current customer. For example, the cable company for which the technician works may have an interest in offering an upgraded Internet and phone package to the customer following resolution of the customer's complaint.

In FIG. 3B, at node 324, if there are open opportunities identified in the CRM database, process 300B is configured to proceed to stage 328, at which a user interface on the technician's mobile device is controlled to direct the technician to try to sell the open opportunities to the current customer before leaving. Returning to node 324, when there are no open opportunities identified, process 300B is configured to proceed to decision node 332. In this example, node 332 is defined by a user-configurable workflow rule to check whether current global positioning system (GPS) coordinates of the technician's mobile phone are within 10 miles of addresses of any other customers to whom the open opportunities can be pitched before the technician's next scheduled appointment. In this example, 10 miles is a configurable criterion, which can be customized by a user depending on the desired implementation. For example, a distance greater than 10 miles between the technician and another customer to whom the opportunities are applicable may represent an unreasonably long time required for the technician to travel before the technician's next scheduled appointment.

In FIG. 3B, at node 332, when the GPS coordinates indicate that another customer is within the 10 mile radius, process 300B is configured to proceed to stage 336, at which the user interface on the technician's mobile device is controlled to display a prompt directing the technician to drive to visit the other customer and pitch the new opportunities. At 332, when the GPS coordinates indicate that there are no other customers within the 10 mile radius, process 300B is configured to proceed to stage 340 to direct the technician to drive to the next appointment to service the next customer having technical issues or other problems.

Figure 3C:
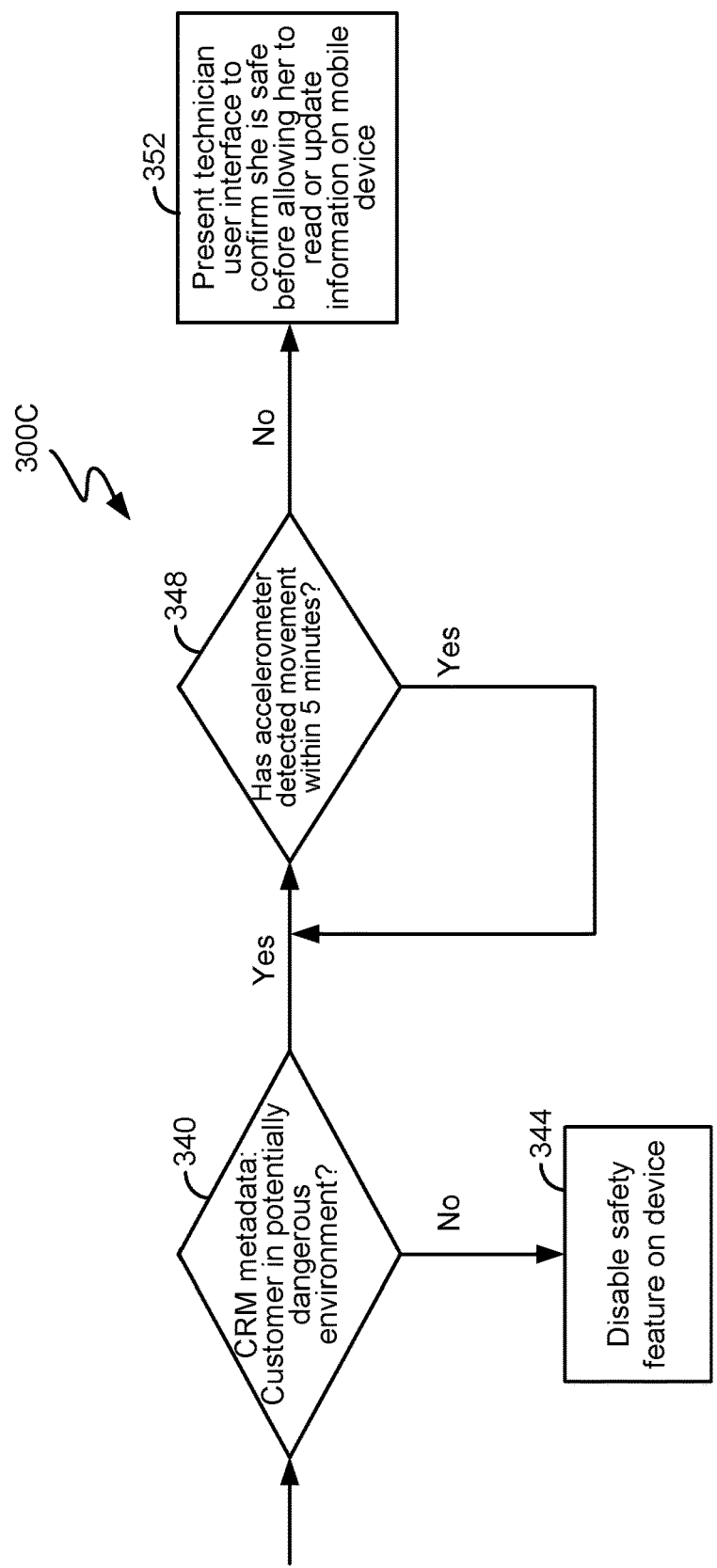
FIG. 3C shows a partial flow diagram of another example of a process 300C being dynamically configured based on environmental characteristics monitored by a mobile device, according to some implementations.

FIG. 3C shows a partial flow diagram of another example of a process 300C being dynamically configured based on environmental characteristics monitored by a mobile device, according to some implementations. In the example of FIG. 3C, when dynamically configurable process 300C reaches decision node 340, metadata stored in a CRM database is checked to determine whether the customer is located in a potentially dangerous environment.

For example, any of the various types of environmental characteristics detected by the mobile device can be compared with CRM metadata to determine whether criteria indicating a dangerous environment are satisfied. If not, process 300C is configured to proceed to stage 344, at which a safety feature on the technician's mobile device is disabled.

In FIG. 3C, returning to node 340, when comparison of environmental data with CRM metadata indicates that a given customer is likely in a potentially dangerous environment, process 300C is configured to proceed to decision node 348, at which it is determined whether an accelerometer in the technician's mobile device has detected any movement of the device within a time threshold, such as 5 minutes. As in the examples of FIGS. 3A and 3B, 5 minutes is a user-customizable criterion, which can be set to govern the flow of configurable process 300C. At node 348, when movement has been detected within the 5 minute threshold, process 300C is configured to repeat the determination at node 348, generally after some delay period such as 5 seconds. At node 348, in instances when no movement has been detected within 5 minutes, process 300C is configured to proceed to 352, at which the user interface on the technician's mobile device is controlled to display a prompt requesting input from the technician to confirm that the technician is safe before displaying data for the technician to read and before enabling the device to allow the technician to update information.

Figure 4A:
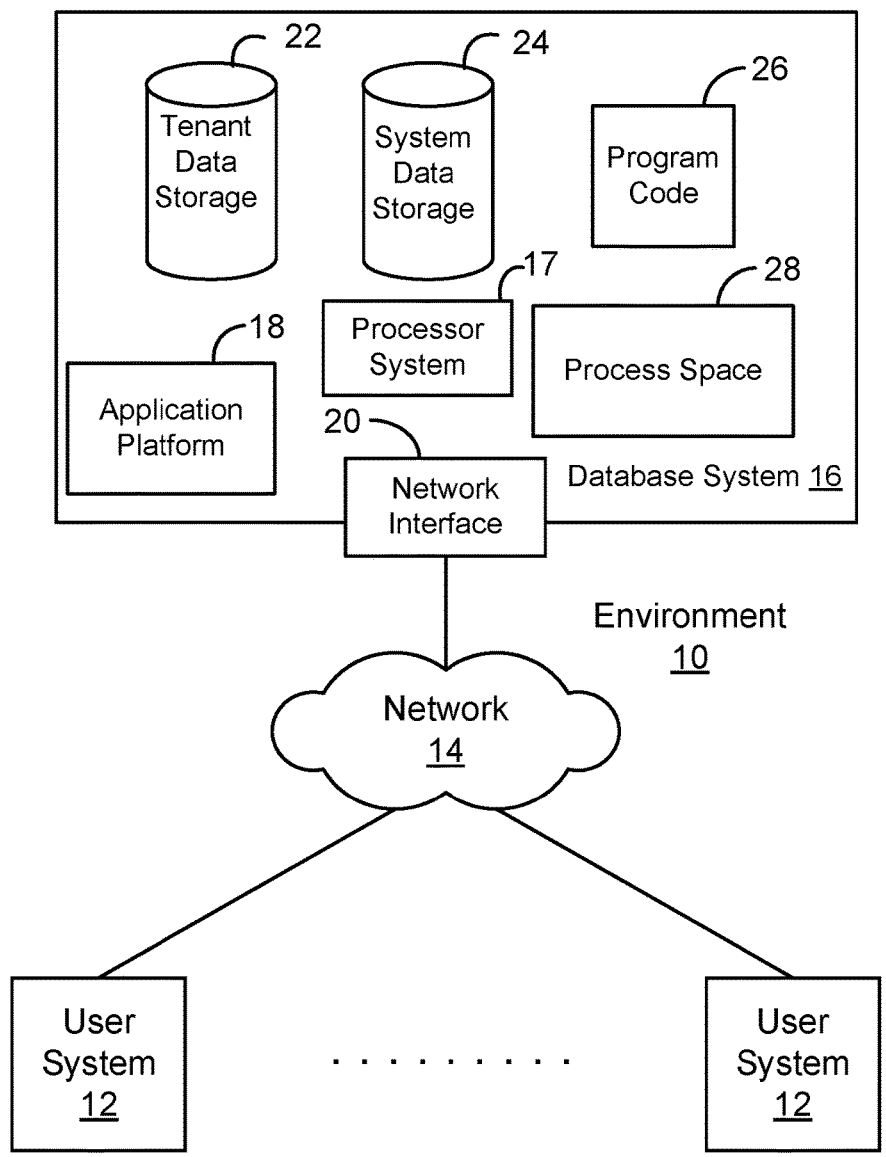
FIG. 4A shows a block diagram of an example of an environment 10 in which an on-demand database service can be used in accordance with some implementations.

FIG. 4A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or mobile computing device such as a mobile phone, a smartphone, a laptop computer, or a tablet. Other examples of a user system include computing devices such as a work station and/or a network of computing devices. As illustrated in FIG. 4A (and in more detail in FIG. 4B) user systems 12 might interact via a network 14 with an on-demand database service, which is implemented in the example of FIG. 4A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RD-BMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization. Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 4A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 4B:
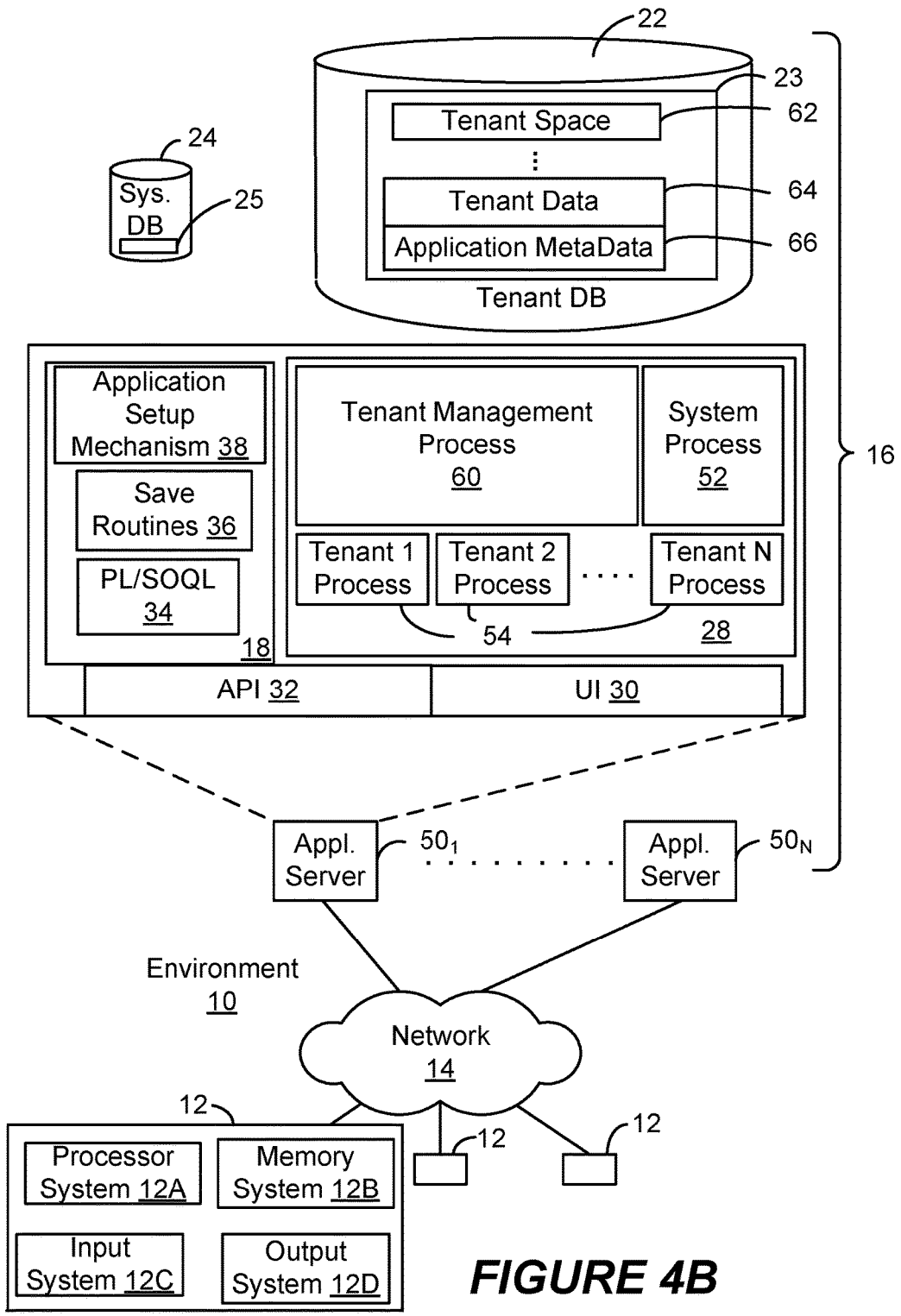
FIG. 4B shows a block diagram of an example of some implementations of elements of FIG. 4A and various possible interconnections between these elements.

One arrangement for elements of system 16 is shown in FIGS. 4A and 4B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 4A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 4B shows a block diagram of an example of some implementations of elements of FIG. 4A and various possible interconnections between these elements. That is, FIG. 4B also illustrates environment 10. However, in FIG. 4B elements of system 16 and various interconnections in some implementations are further illustrated. FIG. 4B shows that user system 12 may include processor system 12A, memory system 12B, input system 12C, and output system 12D. FIG. 4B shows network 14 and system 16. FIG. 4B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 4A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 4B, system 16 may include a network interface 20 (of FIG. 4A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 5A:
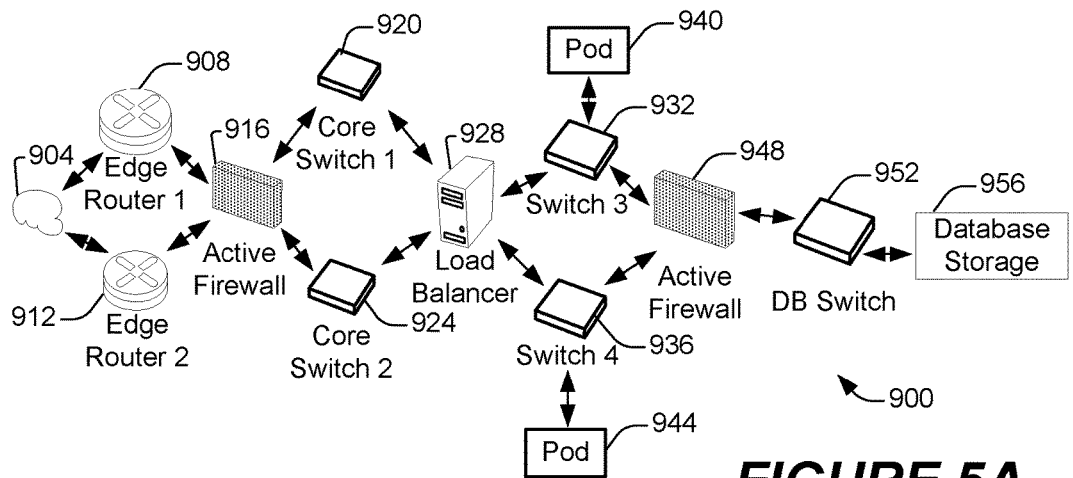
FIG. 5A shows a system diagram of an example of architectural components of an on-demand database service environment 900, in accordance with some implementations.

FIG. 5A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 5B:
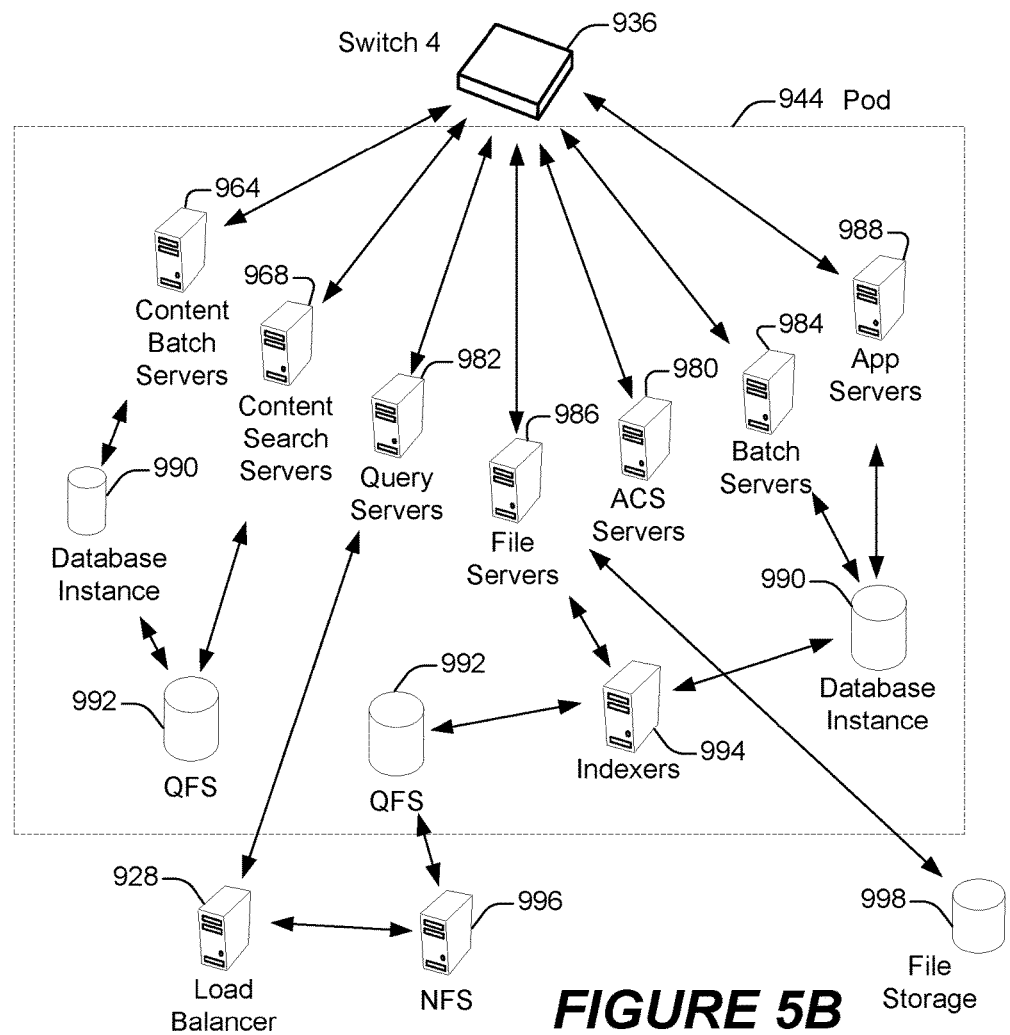
FIG. 5B shows a system diagram further illustrating an example of architectural components of an on-demand database service environment, in accordance with some implementations.

As shown in FIGS. 5A and 5B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 5A and 5B, some implementations of an on-demand database service environment may include anywhere from one to many devices of each type. Also, the on-demand database service environment need not include each device shown in FIGS. 5A and 5B, or may include additional devices not shown in FIGS. 5A and 5B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 5B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 5A and 5B.

FIG. 5B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 4A and 4B include a hardware and/or software framework configurable to execute procedures using programs, routines, scripts, etc. Thus, in some implementations, one or more of application servers $50_1$-$50_N$ of FIG. 4B can be configured to initiate performance of one or more of the operations described above with reference to FIGS. 1-3C by instructing another computing device to perform an operation. In some implementations, one or more application servers $50_1$-$50_N$ carry out, either partially or entirely, one or more of the disclosed operations described with reference to FIGS. 1-3C. In some implementations, app servers 988 of FIG. 5B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1-3C. In alternative implementations, two or more app servers 988 may cooperate to perform or cause performance of such operations. Any of the databases and other storage facilities described above with reference to FIGS. 4A, 4B, 5A and 5B can be configured to store lists, articles, documents, records, files, and other objects for implementing the operations described above with reference to FIGS. 1-3C. For instance, lists of available communication channels associated with share actions for sharing a type of data item can be maintained in tenant data storage 22 and/or system data storage 24 of FIGS. 4A and 4B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 4A, 4B, 5A and 5B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for dynamically configuring a process associated with an application based on environmental characteristics, the system comprising:
   a database system implemented using a server system comprising one or more processors, the database system configurable to cause:
   providing the process associated with the application, the process comprising stages and associated decision nodes, the process having a configurable flow along a path definable by a subset of the stages controllable by a subset of the associated decision nodes, each decision node being controllable at least in part by a respective one or more criteria,
   processing contextual data provided by a mobile device on which the application is usable, the contextual data indicating one or more environmental characteristics monitored using electronics of the mobile device, the one or more environmental characteristics being associated with a physical environment in which the mobile device is or has been located, the processing of the contextual data comprising:
   providing the contextual data as a control input to one of the subset of decision nodes, the one decision node associated with a current stage of the process, and
   determining that the contextual data satisfies one or more criteria at least partially controlling the one decision node;
   configuring the process responsive to determining that the contextual data satisfies the one or more criteria, the configuring of the process comprising determining and/or configuring a next stage to follow the current stage of the process; and
   storing or updating database data in a database to identify the configuring of the process.

2. The system of claim 1, the database system further configurable to cause:
   updating a user interface at the mobile device to indicate at least the next stage of the process.

3. The system of claim 1, wherein the application is situated on the mobile device or on a server with which the mobile device is capable of communicating.

4. The system of claim 1, wherein configuring the process comprises one or more of: determining and/or configuring a behavior of the process, determining and/or configuring a logic of the process, determining and/or configuring a functionality of the process, determining and/or configuring a logic of a stage of the process, determining and/or configuring a workflow rule associated with a logic of the process, determining and/or configuring one or more user actions to be performed, or determining and/or configuring one or more system events to be performed.

5. The system of claim 4, wherein a system event is determined and/or configured to be performed in relation to one or more of: a social network feed or a customer relationship management (CRM) record stored in a database.

6. The system of claim 4, wherein a user action is determined and/or configured to be performed in relation to a task-based workflow.

7. The system of claim 1, wherein determining that the contextual data satisfies the one or more criteria comprises:
applying one or more user-configurable workflow rules to the contextual data, the one or more workflow rules being configurable by a reference value with which at least a portion of the contextual data can be compared.

8. The system of claim 1, wherein the environmental characteristics comprise at least: accelerometer information, geolocation information, altitude information, battery life information, network signal strength information, proximity sensor information, light level information, noise level information and fingerprint information.

9. The system of claim 1, wherein determining the next stage of the process comprises one or more of: replacing a stage, removing a stage, adding a stage, or modifying a stage.

10. The system of claim 1, wherein the next stage comprises one or more suggested tasks for a user to perform.

11. A computer program product comprising computer-readable program code capable of being executed by one or more processors when retrieved from a non-transitory computer-readable medium, the program code comprising instructions configurable to cause:
providing a process associated with an application, the process comprising stages and associated decision nodes, the process having a configurable flow along a path definable by a subset of the stages controllable by a subset of the associated decision nodes, each decision node being controllable at least in part by a respective one or more criteria,
processing contextual data provided by a mobile device on which the application is usable, the contextual data indicating one or more environmental characteristics monitored using electronics of the mobile device, the one or more environmental characteristics being associated with a physical environment in which the mobile device is or has been located, the processing of the contextual data comprising:
providing the contextual data as a control input to one of the subset of decision nodes, the one decision node associated with a current stage of the process, and
determining that the contextual data satisfies one or more criteria at least partially controlling the one decision node;
configuring the process responsive to determining that the contextual data satisfies the one or more criteria, the configuring of the process comprising determining and/or configuring a next stage to follow the current stage of the process; and
storing or updating database data in a database to identify the configuring of the process.

12. The computer program product of claim 11, wherein configuring the process comprises one or more of: determining and/or configuring a behavior of the process, determining and/or configuring a logic of the process, determining and/or configuring a functionality of the process, determining and/or configuring a logic of a stage of the process, determining and/or configuring a workflow rule associated with a logic of the process, determining and/or configuring one or more user actions to be performed, or determining and/or configuring one or more system events to be performed.

13. The computer program product of claim 11, wherein determining that the contextual data satisfies the one or more criteria comprises:
applying one or more user-configurable workflow rules to the contextual data, the one or more workflow rules being configurable by a reference value with which at least a portion of the contextual data can be compared.

14. The computer program product of claim 11, wherein the environmental characteristics comprise at least: accelerometer information, geolocation information, battery life information, network signal strength information, proximity sensor information, light level information, and noise level information.

15. The computer program product of claim 11, wherein determining the next stage of the process comprises one or more of: replacing a stage, removing a stage, adding a stage, or modifying a stage.

16. A method comprising:
providing a process associated with an application, the process comprising stages and associated decision nodes, the process having a configurable flow along a path definable by a subset of the stages controllable by a subset of the associated decision nodes, each decision node being controllable at least in part by a respective one or more criteria,
processing contextual data provided by a mobile device on which the application is usable, the contextual data indicating one or more environmental characteristics monitored using electronics of the mobile device, the one or more environmental characteristics being associated with a physical environment in which the mobile device is or has been located, the processing of the contextual data comprising:
providing the contextual data as a control input to one of the subset of decision nodes, the one decision node associated with a current stage of the process, and
determining that the contextual data satisfies one or more criteria at least partially controlling the one decision node;
configuring the process responsive to determining that the contextual data satisfies the one or more criteria, the configuring of the process comprising determining and/or configuring a next stage to follow the current stage of the process; and
storing or updating computer readable data in a computer readable medium to identify the configuring of the process.

17. The method of claim 16, wherein configuring the process comprises one or more of: determining and/or configuring a behavior of the process, determining and/or configuring a logic of the process, determining and/or configuring a functionality of the process, determining and/or configuring a logic of a stage of the process, determining and/or configuring a workflow rule associated with a logic of the process, determining and/or configuring one or more user actions to be performed, or determining and/or configuring one or more system events to be performed.

18. The method of claim 16, wherein determining that the contextual data satisfies the one or more criteria comprises:
applying one or more user-configurable workflow rules to the contextual data, the one or more workflow rules being configurable by a reference value with which at least a portion of the contextual data can be compared.

19. The method of claim 16, wherein the environmental characteristics comprise at least: accelerometer information, geolocation information, battery life information, network signal strength information, proximity sensor information, light level information, and noise level information.

20. The method of claim 16, wherein determining the next stage of the process comprises one or more of: replacing a stage, removing a stage, adding a stage, or modifying a stage.

* * * * *